MULTIPLE CONDUCTOR CABLE CONNECTION

Filed Feb. 12, 1963 2 Sheets-Sheet 1

INVENTORS
CHARLES J. BOWDEN &
ELWOOD C. FRISVOLD
BY
Gardner & Zimmerman
ATTORNEYS Nov. 24, 1964 C. J. BOWDEN ETAL 3,158,422

MULTIPLE CONDUCTOR CABLE CONNECTION

Filed Feb. 12, 1963

2 Sheets-Sheet 2

INVENTORS
CHARLES J. BOWDEN &
ELWOOD C. FRISVOLD
BY
Gardner & Zimmerman
ATTORNEYS 3,158,422
MULTIPLE CONDUCTOR CABLE CONNECTION Charles J. Bowden, 600 Amador St., Richmond, Calif., and Elwood C. Frisvold, 2619 Arlington Blvd., El Cerrito, Calif.

Filed Feb. 12, 1963, Ser. No. 257,941
10 Claims. (Cl. 339—183)

This invention relates to the connection of multiple conductor cables of the type employed in the installation of telephone equipment and the like, and is particularly directed to improved multiple conductor cable connector means of compact design which facilitate the installation of a complex wiring system with a material saving in installation time.

In the installation of complex wiring systems as employed for example with telephone equipment, it is necessary that numerous connections be made between the conductors of a number of multiple conductor cables, as well as between the cable conductors and various terminal equipment. In accomplishing these connections it is common practice to terminate the individual cable conductors at lugs of a terminal strip or the like, and to connect the lugs in a predetermined manner with jumper wires. By virtue of the numerous connections involved, the on-the-job installation of the wiring system is tedious and time consuming.

It is therefore an object of the present invention to provide improved means for connecting conductors of multiple conductor cables.

A more specific object of the invention is to provide a plug for terminating a multiple conductor cable, and jack means for connecting conductors of multiple conductor cables.

A more specific object of the invention is to provide a plug for terminating a multiple conductor cable, and jack means for receiving the plug and thereby connecting the cable conductors in electrical circuit with other conductors of the jack means.

Another object of the invention is the provision of a multiple connecting block having a plurality of jacks, each adapted to receive a plug terminating the conductors of a multiple conductor cable, such block arranged to electrically connect in a predetermined manner the conductors of a plurality of cables having their associated plugs received in the jacks.

Still another object of the invention is to provide a multiple connecting block of the class described which has a first pair of jacks in one end and a second pair of jacks in the other end, each of said jacks having a plurality of circuit terminations for conducting contact with a plurality of circuit terminations of a plug, the corresponding jack terminations of the first and second pairs thereof being respectively interconnected in a predetermined manner by printed circuits within the block such that installation of a desired wiring system is accomplished merely by inserting terminating plugs of multiple conductor cables within the jacks.

Yet another object of the invention is the provision of a terminating plug for multiple conductor cable which is no larger in diameter than the cable itself whereby either end of a cable with which the plug is associated can be readily pulled through drilled holes in wall studding, flooring, conduits, and the like.

Another object of the invention is to provide auxiliary connecting block means having a jack with circuit terminations therein adapted for conducting contact with circuit terminations of a plug of the class described hereinbefore and having external terminals in electrical connection with the jack terminations. As an advantageous consequence, a cable with terminating plugs at its opposite ends may be plugged into one of the jacks of a multiple connecting block of the class hereinbefore described and into the jack of the auxiliary block means to thus facilitate access at the external terminals thereof to the conductors of cables associated with the multiple connecting block.

It is a further object of the invention to provide cable connecting means of the class described having provision to insure proper orientations of the plugs within the jacks commensurate with connection of corresponding conductor pairs of respective cables.

A still further object of the invention to the provision of cable connecting means of the class described which are relatively simple and economical in construction and, moreover, which can be salvaged and reused a number of times.

The invention possessess other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Figure 1:
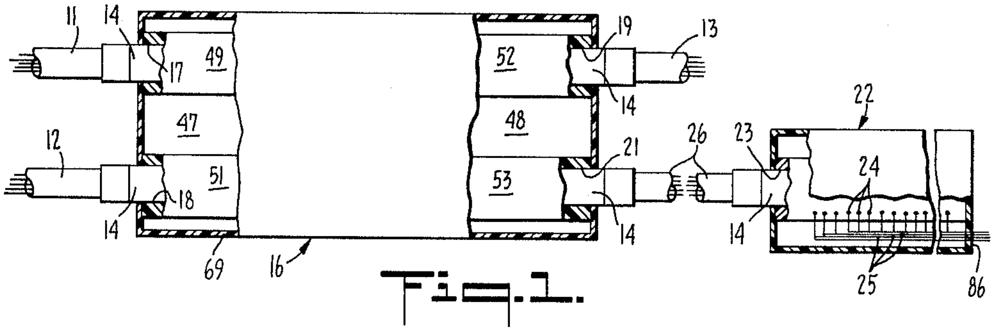
FIGURE 1 is a semi-schematic illustration of connector means in accordance with the present invention.

Referring now to FIGURE 1, there is shown connector means for connecting corresponding conductor pairs of multi-conductor cables to each other and to various auxiliary circuits. More particularly, as illustrated, the connector means facilitates connection of conductor pairs of cable 11 to conductor pairs of cables 12 and 13, and to electrical circuits as generally indicated at 25. To facilitate such connections, the connector means include a plug 14 secured to the end of each of the cables 11, 12, 13, and having a plurality of terminal contacts, respectively connected to the cable conductors.

In addition, a multiple jack connector 16 is provided including, for example, jacks 17, 18, 19, 21, each of which has a plurality of terminal contacts arranged for electrically conducting engagement with the contacts of one of the plugs 14 inserted therein. The contacts of the respective jacks 17, 18, 19, 21, moreover, are electrically interconnected within the connector in a manner subsequently described in detail. With the plugs at the ends of cables 11, 12, 13 inserted in the jacks 17, 18, 19, the conductor pairs of the cables are accordingly interconnected in a predetermined manner by virtue of the interconnection of the jack contacts within the connector. The connector means further includes an auxiliary connector 22 which is provided with a jack 23 similar to the jacks of the block 16, and a plurality of externally accessible terminals 24 respectively connected within the block to the contacts of the jack 23. A cable 26 with plugs 14 at its opposite ends respectively inserted in the jack 21 of connector 16 and jack 23 of connector 22 facilitates connection of the conductor pairs of the cables 11, 12, 13 to the externally accessible terminals 24. Auxiliary circuits 25 may be connected to the terminals 24 as desired and thus to the conductor pairs of the cables just described.

Figure 2:
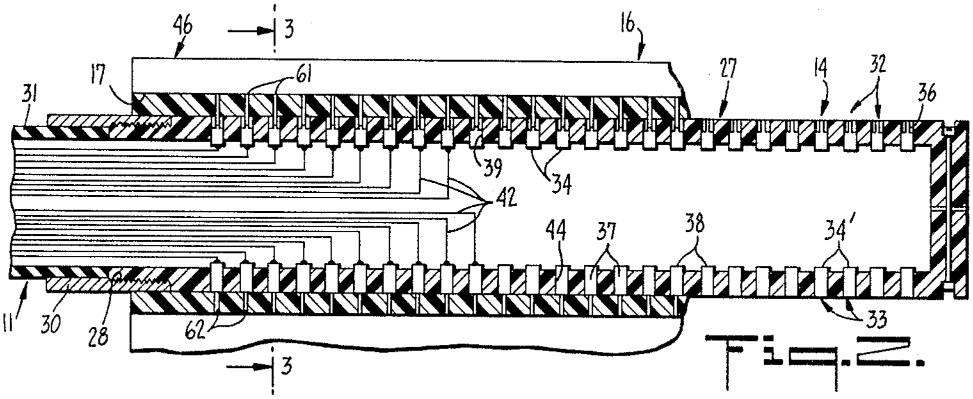
FIGURE 2 is a fragmentary sectional view taken at a diametric plane through a multiple jack connecting block shown in FIGURE 1.
Figure 3:
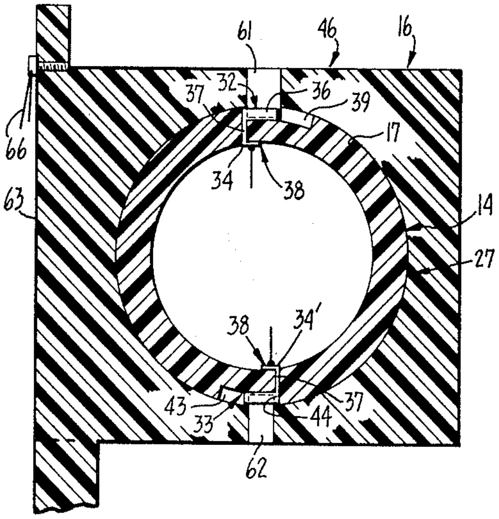
FIGURE 3 is a fragmentary sectional view on an enlarged scale taken at line 3—3 of FIGURE 2, illustrating particularly the spring fork terminal lugs of the plug as operatively positioned within the connecting block.
Figure 4:
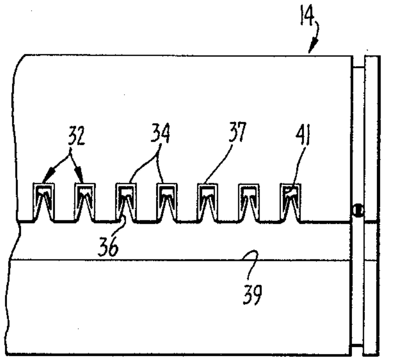
FIGURE 4 is a fragmentary plan view of the plug illustratin further details of the spring fork terminal lugs thereof.

Considering now the plug 14 in greater detail as to preferred structure, and referring particularly to FIGURES 2 and 3, such plug will be seen to include an elongated tubular cylindrical body 27 closed at one end. The body is formed of plastic or equivalent durable electrical insulating material, and has an outside diameter slightly larger than that of a multi conductor cable, for example, cable 11. The body is preferably provided with a reduced roughened gripping portion 28 adjacent its open end which is adapted to engage the interior of a band 30, or the like secured concentrically about the insulating cover 31 of the cable 11. The portion 28 of the plug body may thus be secured within the band to facilitate attachment of the plug to the cable.

To facilitate electrical terminations in the plug for the conductor pairs of a cable to which it is attached, a plurality of longitudinally spaced terminal contacts 32 are carried by the body extending through the peripheral wall thereof to terminate first ones of the conductor pairs. A plurality of similar terminal contacts 33 are carried by the body in diametric opposition to the first plurality thereof to terminate the second ones of the conductor pairs. Each of the contacts 32, 33 is preferably provided as a spring fork 34 of electrically conducting material which includes a strip portion 36 of substantially W configuration with the ends of its outside legs interconnected by a base strip portion 37. The strip portion 36 thus defines a pair of resilient prongs with a V notch therebetween. The base strip portion 37 depends from the prong strip portion 36 in right angular relation thereto, and the free end of the base portion is provided with a right angularly turned lug 38.

Mounting of the spring forks 34 in the plug body is facilitated by a channel 39 in its periphery and extending longitudinally from the closed end thereof. One side wall of the channel is formed with a plurality of longitudinally spaced notches 41 of substantially rectangular configuration which extend circumferentially from the channel in a given angular direction, for example, counterclockwise. Each of the notches is arranged to receive the outside legs of the prong portion 36 of one of the spring forks 34, with the V-notch thereby defined facing the channel. The depending base strip portion 37 then extends radially inward through the peripheral wall of the plug body with the lug 38 being disposed within the base thereof. First ones of the pairs of cable conductors 42 are electrically connected, as by soldering, to the lugs 38, whereby these cable conductors are terminated by respective ones of the spring forks 34.

In a similar manner a second longitudinally extending channel 43 is formed in the periphery of the plug body in diametric opposition to the channel 39. Notches 44 are provided in one side wall of the channel extending thereinto in the same circumferential direction (counterclockwise) as the notches 41 so as to be in diametric opposition thereto. Spring forks 34[1] are provided with their prong strip portions disposed within the notches, the V-notches of the prong strips facing the channel. The base strip portions of the spring forks extend radially inward through the plug body peripheral wall and the second ones of the chairs of cable conductors are electrically connected to the lugs of these spring forks interiorly of the plug body. One of each pair of conductors is thus terminated at a spring fork 34 and the other conductor is terminated at the diametrically opposed spring fork 34[1].

Figures 5, 6, 7, 8:
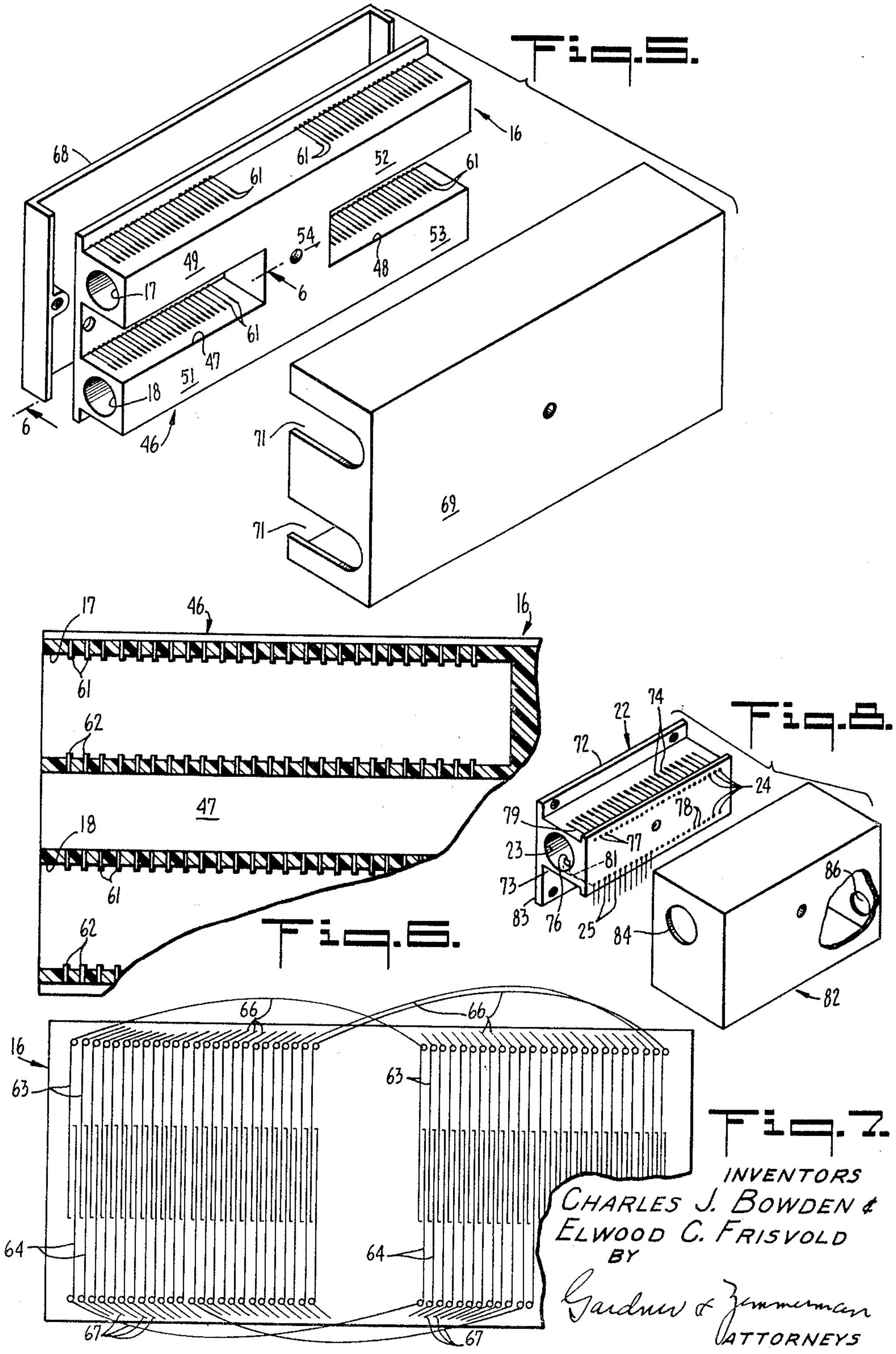
FIGURE 5 is an exploded perspective view of the multiple jack connecting block of the connecting means.
FIGURE 6 is a sectional view taken at line 6—6 of FIGURE 5, illustrating particularly the terminal contact knives of the jacks thereof which are adapted for mating engagement with the spring fork lugs of a plug inserted in a jack.
FIGURE 7 is a rear elevation view of the block of FIGURE 5, illustrating the printed circuits and jumpers of the block as employed to interconnect the contact knives of the jacks thereof.
FIGURE 8 is an exploded perspective view of an auxiliary connecting block of the connector means.

Considering now the multiple jack connector 16 and referring to FIGURES 5–7, same will be seen to include a rectangular block 46 of plastic or equivalent durable insulating material. A pair of rectangular channels 47, 48 are formed in one side face of the block to extend from its opposite ends axially to positions short of the transverse median plane of the block. This side face of the block is thus of H-shaped configuration including parallel longitudinal rib sections 49, 51 at one end of the block, parallel longitudinal rib sections 52, 53 at the other end of the block and coextensive with rib sections 49, 51, and a central cross rib section 54 extending between the rib sections 49, 51 and 52, 53 at their intersections. Bores extend into the ends of the rib sections to define the jacks 17, 18, 19, 21 of previous mention for receiving the plugs 14. Electrical terminations are provided in each of the upper jacks 17, 19, preferably by a plurality of contact knives 61 extending through the exterior edge face of the corresponding rib section and projecting into the jack bore at longitudinally spaced positions. The flat faces of the knives are transversely disposed relative to the bore axis and are dimensioned to substantially correspond to the cross section of the channel 39 of the plug 14. Similarly, a second plurality of contact knives 62 extend through the interior edge face of the rib section to project into the jack bore at longitudinally spaced positions in substantially diametric opposition to the knives 61. The flat faces of knives 62 are dimensioned to correspond to the cross section of the plug channel 43. The longitudinal spacing of the knives 61 and 62 associated with each jack corresponds to the longitudinal spacing of the V-notches of the plug spring forks 34. Terminations for the lower jacks 18, 21 are facilitated in an analogous manner except that knives 61 extend through the interior edge faces of the corresponding rib sections whereas knives 62 extend through the exterior edge faces thereof. It will be thus appreciated that a plug 14 may be inserted into each jack with the plug channels 39, 43 being aligned with and receiving the rows of knives 61 and 62. With the plug fully inserted the edges of the knives are correspondingly transversely aligned with the V-notches of the spring forks. Accordingly, the plug may at this time be rotated to engage the knives in the V-notches of the spring forks. The prongs of the spring forks being resilient, the knives are effectively gripped by the spring forks to provide good electrical contact therebetween, while at the same time facilitating locking of the plug within the jack.

Interconnection of the terminal knives 61, 62 of the respective jacks of the block 46 to facilitate connection of cable conductors terminated by plugs 14 inserted in the jacks in a predetermined manner is preferably accomplished by printed circuits joined in the block at the time of its manufacture. More particularly, conductors 63 are printed on the rear face of the block and respectively extend through the block into connection with corresponding sets of knives 61 associated with jacks 17, 18. Conductors 64 are also printed on the rear face of the block and extend through the block into connection with corresponding sets of knives 62 associated with jacks 17, 18. Similarly, printed conductors 63, 64 are provided on the rear face of the block at the opposite end thereof to connect corresponding sets of knives 61 and 62 associated with jacks 19, 21. It will be thus appreciated that when terminating plugs 14 of cables are inserted in the pair of jacks 17, 18 at one end of the block, the conductor pairs of one cable are electrically connected to the corresponding conductor pairs of the other cable. Similar connection of conductor pairs of cables is facilitated upon insertion of their terminating plugs in the jacks 19, 21 at the other end of the block. Predetermined interconnection of conductor pairs of cables associated with the jacks 17, 18 and 19, 21 respectively at the opposite ends of the block is facilitated by jumper conductors 66, 67 connected between corresponding conductors 63, 64 associated with given cable conductor pairs at one end of the block, and corresponding conductors 63, 64 associated with other given cable conductor pairs at the opposite end of the block. Inasmuch as the jumper conductors 66, 67 may be connected in a predetermined manner at the factory commensurate with a desired complex circuit installation, the actual on-the-job circuit installation is accomplished with a material having in time merely by inserting cable plugs into the jacks of the multiple connecting blocks.

To complete the multiple jack connector, the block 46 is preferably secured to a mounting plate 68 which may be readily attached to a wall, or the like. In addition, a cover 69, of plastic or the like, is best provided to slip over the mounting strip in enclosing relation to the block. Pairs of transversely elongated slots 71 are formed in the opposite ends of the cover extending inward from a side edge thereof and in registry with the jacks. The slots permit insertion of plugs into the jacks, and moreover, facilitate removal of the cover even when plugs are operatively engaged in the jacks.

Considering now the auxiliary connector 22, in detail as to preferred structure, and referring to FIGURE 8, such connector will be seen to be generally similar to the multiple connector described hereinbefore, but having only one jack with its circuit terminations in electrical connection with an externally accessible terminal strip. More particularly, the auxiliary connector includes a block 72 of insulating material, preferably plastic, is provided having an axial bore 73 extending into one end thereof to define the jack 23 of previous mention adapted to receive the plugs 14. A plurality of longitudinally spaced contact knives 74 extend through the block from one side face thereof to project into the jack defining bore. Similarly, a second plurality of longitudinally spaced contact knives 76 extend through the block from the opposite side face thereof to project into the bore in opposition to knives 74. Both knives 74 and 76 are disposed with their flat faces parallel to planes transversely through the bores such that the edges of the knives are registerable with the V-notches of the spring fork contacts 34, $34^1$ of the plugs 14. One of the plugs may thus be inserted into jack 23 with the knives 74 and 76 respectively received by the plug channels 39 and 43. As in the case of the multiple connector block, upon full insertion of the plug into the jack 23, the plug may be rotated to thus engage the knives in the spring contacts. Electrical connection between the spring contacts and corresponding knives is thereby established in conjunction with locking of the plug in the jack.

With respect to the externally accessible terminal strip of the auxiliary block, same is preferably defined by rows of screws 77 and 78 in one broad face of the block adjacent the opposite side edges thereof. Printed circuit conductors 79 are then preferably provided extending from the knives 74 at the corresponding side face of the block into conducting relation with the respective screws 77 adjacent same. Printed circuit conductors 81 are likewise employed to connect the knives 76 to the respective screws 78. Thus each opposed set of screws 77 and 78 corresponds to a different pair of conductors of a cable terminated in a plug 14, which is in turn inserted in the jack 23 of the auxiliary block. A length of cable, e.g., cable 26, having its opposite ends terminated by plugs 14 may consequently be readily employed with one plug inserted in a jack of a multiple connector 16 and the other plug inserted in jack 23 of the auxiliary block to connect respective conductor pairs of cable associated with the connector 16 to corresponding sets of the terminal screws 77 and 78. External circuits, e.g. circuits 25, may thus be coupled to particular conductor pairs of cable associated with the multiple connection block merely by connecting circuit leads to the corresponding sets of screws.

The auxiliary connector further preferably includes a cover 82 of plastic or equivalent insulating material for enclosing the block 72. The cover is of rectangular box-like configuration with an open end and having its inner periphery conformed to that of a flange 83 integrally extending from opposite sides of the rear face of the block to facilitate attachment to a wall or the like. The cover may thus be inserted over the block and secured in enclosing relation thereto. One end wall of the cover is provided with an aperture 84 positioned to register with the jack 23 and thus to receive a plug 14 inserted in the jack. The opposite end wall of the cover also contains an aperture 86 for traversal of auxiliary circuit conductors connected to the terminal strip screws 77, 78.

It is additionally important to note that the auxiliary connector may be advantageously provided in direct association with various relay and other equipment units. More particularly, the auxiliary connector may be mounted upon the inside of a door or the like of such an equipment bay and the circuits of the equipment connected to the terminal screws 77, 78 of the connector in a predetermined manner. Thus with the auxiliary connector provided integrally with the equipment bay and appropriately connected in circuit therewith, to install the equipment in a complex wiring system it is only necessary to insert a plug 14 terminating a multiple conductor cable of the system into the jack 23 of the connector 22. In other words, the connector 22 may be employed as an adapter jack with equipment bays, etc., to adapt same to ready circuit connection in complex wiring systems.

It will be appreciated that rather disastrous effects may be produced where conductors pairs of one cable are connected in reversed relation to corresponding conductor pairs of another cable. Such reversal in connection is of course effected where plugs are inserted into the connector jacks with reversed orientations from the predetermined consistent orientations assumed in the connections of the contact knives of one jack to those of another, or to other circuit terminations. In order to insure proper interconnections of cable conductors pairs provision is made in the connector means of the present invention to prevent insertion of plugs in the connector jacks with any but the proper orientation. More particularly, the plug channels 39, 43 are respectively of different widths. The knives 61, 62 of the multiple connector and knives 74, 76 of the auxiliary connector are likewise of different widths corresponding to the widths of the channels which are to receive these knives when the plugs are properly orientated in the jacks. In other words knives 61 or 74 can only be received by their associated proper channel 39, while knives 62 or 76 can only be received by their associated proper channel 43. When the orientation of a plug is reversed, the plug cannot be inserted into a jack by virtue of the width of knives 61 or 74 being greater than the width of channel 43. The plug thus can only be inserted into a jack when the plug has the proper orientation.

What is claimed is:

1. Multiple conductor cable connecting means comprising a hollow plug of insulating material adapted to receive an end of a multiple conductor cable, a plurality of electrically conducting terminal contacts having exterior resilient fork portions disposed in the outer periphery of said plug and adapted for connection to the respective conductors of said cable, a connector of insulating material having at least one jack therein for receiving said plug, a second plurality of electrically conducting terminal contacts carried by said connector and having projecting knife portions disposed within said jack, side knife portions complementary to the exterior fork portions of said contacts of said plug and resiliently engageable therein, at least one additional plurality of terminal contacts carried by said connector, and printed circuit means connecting said second plurality of contacts to said additional pluralities of contacts in predetermined relationship.

2. Multiple conductor cable connecting means comprising a multiple connector including a block of insulating material, said block having a plurality of jack defining bores, a plurality of sets of connector contacts carried by said block and having knife portions respectively projecting into the interiors of said bores at longitudinally spaced positions thereof, printed circuit means carried by said block and interconnecting said sets of contacts in predetermined relationship, a plurality of multiple conductor cables, a hollow plug of insulating material receiving an end of each of said cables and a plurality of plug contacts carried by each said plug having exterior resilient fork portions correspondingly longitudinally spaced and complementary to said sets of connector contacts, said plug contacts of each said plug respectively connected to the conductors of the cable associated therewith, said plug respectively removably inserted into said bores of said block with the exterior fork portions of the plug contacts correspondingly resiliently engaged with said knife portions of said sets of connector contacts.

3. Multiple conductor cable connecting means comprising a multiple connector including a block of insulating material, said block having a plurality of jack defining bores, a plurality of contact knives projecting into each said bore at aligned longitudinally spaced positions thereof, said knives having flat faces disposed in planes transversely of said bore, printed circuit means carried by said block and interconnecting the pluralities of knives projecting into the respective bores in predetermined relationship, a plurality of hollow cylindrical plugs of insulating material closed at one end and open at the other to receive ends of multiple conductor cables, each said plug having a channel in its periphery extending longitudinally inward from the closed end thereof and a plurality of electrically conducting spring forks associated with each plug and each fork having resilient prong portions defining a V-notch therebetween and a lug portion depending from the prong portions, said forks mounted in said plug with the prong portions thereof circumferentially adjacent said channel and the V-notches therebetween facing into said channel at longitudinally spaced positions thereof corresponding to the longitudinally spaced positions of said knives, said lug portions of said forks extending radially through the peripheral wall of said plug and into the interior thereof for respective correction to conductors of a cable received by said plug, said plugs removably inserted into said bores with said contact knives engaged between the prong portions of the corresponding spring forks.

4. Multiple conductor cable connecting means comprising a multiple connector including a block of insulating material, said block having a plurality of jack defining bores, a first plurality of contact knives projecting into each said bore at longitudinally spaced positions thereof, said knives having longitudinally aligned flat faces disposed in planes transversely of said bore, a second plurality of contact knives projecting into each said bore in diametrically opposed relation to the first plurality of knives projecting thereinto, printed circuit means carried by said block and interconnecting said first and second pluralities of knives projecting into the respective bores in predetermined relationship, a plurality of hollow cylindrical plugs of insulating material closed at one end and open at the other to receive ends of suitable multiple conductor cables, each said plug having first and second channels in its periphery extending longitudinally inward from the closed end thereof at diametrically opposed positions, said first channel having a cross section conformed to the flat faces of said first plurality of knives and said second channel having a cross section conformed to the flat faces of said second plurality of knives, said first channel having a plurality of longitudinally spaced notches extending circumferentially into a side wall thereof, said second channel having a plurality of longitudinally spaced notches extending into a side wall thereof in the same circumferential direction as the notches of said first channel, a plurality of spring fork contacts having resilient prong portions disposed in the respective notches of said first channel and defining V-notches circumferentially facing thereinto, and a second plurality of spring fork contacts having resilient prong portions disposed in the respective notches of said second channel and defining V-notches circumferentially facing thereinto, said first and second pluralities of spring fork contacts having lug portions extending radially through the peripheral wall of said plug into the interior for connection to conductors of a cable received by said plug, said plugs removably inserted into said bores with said first and second pluralities of contact knives engaged between the prong portions of corresponding ones of said first and second pluralities of spring fork contacts.

5. Multiple conductor cable connecting means according to claim 4, further defined by said first and second pluralities of contact knives having flat faces of different widths and said first and second channels having different widths respectively corresponding to those of said first and second pluralities of contact knives.

6. Multiple conductor cable connecting means according to claim 4, wherein the outside diameter of said plugs is no greater than the outside diameter of the sheath of a multiple conductor cable.

7. Multiple conductor cable connecting means comprising a connector including a block of insulating material having first and second parallel jack defining bores extending into one end thereof and third and fourth jack defining bores extending into the opposite end of the block in respective alignment with said first and second bores, a first plurality of contact knives projecting into each said bore at longitudinally spaced positions thereof, said knives having longitudinally aligned flat faces disposed in planes transversely of said bore, a second plurality of contact knives projecting into each said bore in diametrically opposed relation to the first plurality of knives projecting thereinto, said second pluralities of knives having different transverse widths than said first pluralities of knives, a first plurality of printed circuit conduction paths on said block interconnecting corresponding ones of said first pluralities of knives respectively projecting into said first and second bores, a second plurality of printed circuit conduction paths on said block interconnecting corresponding ones of said second pluralities of knives respectively projecting into said first and second bores, a third plurality of printed circuit conduction paths on said block interconnecting corresponding ones of said first pluralities of knives respectively projecting into said third and fourth bores, a fourth plurality of printed circuit conduction paths on said block interconnecting corresponding ones of said second pluralities of knives respectively projecting into said third and fourth bores, jumper conductor means connecting predetermined ones of said first plurality of printed circuit conduction paths and corresponding ones of said second plurality of printed circuit conduction paths respectively to predetermined ones of said third plurality of printed circuit conduction paths and corresponding ones of said fourth plurality of printed circuit conduction paths, a plurality of hollow cylindrical plugs of insulating material closed at one end and open at the other to receive ends of multiple conductor cables, each said plug having first and second channels in its periphery extending longitudinally inward from the closed end thereof at diametrically opposed positions, said first channel having a cross section conformed to the flat faces of said first plurality of knives and said second channel having a cross section conformed to the flat faces of said second plurality of knives, said first channel having a plurality of longitudinally spaced notches extending circumferentially into a side wall thereof, said second plurality of knives, said first channel having a plurality of longitudinally spaced notches extending circumferentially into a side wall thereof, said second channel having a plurality of longitudinally spaced notches extending into a side wall thereof in the same circumferential direction as the notches of said first channel, a plurality of spring fork contacts having resilient prong portions disposed in the respective notches of said first channel and defining V-notches circumferentially facing thereinto, a second plurality of spring fork contacts having resilient prong portions disposed in the respective notches of said second channel and defining V-notches circumferentially facing thereinto, said first and second pluralities of spring fork contacts having lug portions extending radially through the peripheral wall of said plug into the interior thereof for connection to conductors of a cable received by said plug, said plugs removably inserted into said bores with said first and second pluralities of contact knives engaged between the prong portions of corresponding ones of said first and second pluralities of spring fork contacts, and a box-like cover open at one end enclosing said block, said cover having opposite end walls with pairs of transverse slots extending inwardly from the open end of said cover and aligned with said jacks to permit traversal by said plugs.

8. An auxiliary cable connector for multiple conducter cable comprising a block of insulating materials having a jack defining bore extending into one end thereof, a first plurality of contact knives projecting into said bore at longitudinally spaced positions thereof, said knives having longitudinally aligned flat faces disposed in planes transversely of said bore, a second plurality of contact knives projecting into said bore in diametrically opposed relation to the first plurality of knives projecting thereinto, a first plurality of terminal screws secured to a side face of said block at longtitudinally spaced positions thereof, a second plurality of terminal screws secured to said side face of said block at longitudinally spaced positions opposed to said first plurality of screws, a first plurality of printed circuit conduction paths respectively connecting said first plurality of knives to corresponding ones of said first plurality of screws, a second plurality of printed circuit conduction paths connecting said second plurality of knives to corresponding ones of said second plurality of screws, a hollow cylindrical plug of insulating material closed at one end and open at the other to receive the end of a multiple conductor cable, said plug having first and second channels in its periphery extending longitudinally inward from the closed end thereof at diametrically opposed positions, said first and second channels respectively having cross sections conformed to the flat faces of said first and second pluralities of knives, said first channel having a plurality of longitudinally spaced notches extending circumferentially into a side wall thereof, said second channel having a plurality of longitudinally spaced notches extending into a side wall thereof in the same circumferential direction as the notches of said first channel, and first and second pluralities of spring fork contacts respectively having resilient prong portions disposed in the notches of said first and second channel and defining the notches circumferentially facing thereinto, said first and second pluralities of spring fork contacts having lug portions extending radially through the peripheral wall of said plug into the interior thereof for connection to conductors of a cable received by said plug, said plug removably inserted into said bore with said first and second pluralities of contact knives engaged between the prong portions of the corresponding ones of said first and second pluralities of spring fork contacts.

9. A cable connector as defined by claim 8, further defined by the flat faces of said first and second pluralities of knives having different widths, and said first and second channels having widths respectively conformed to those of the flat faces of said first and second pluralities of knives.

10. A complex wiring system comprising a multiple connector; said connector including a body of insulating material having a plurality of jack defining bores therein, a plurality of sets of connector contacts carried by said body and respectively projecting into the interiors of said bores at longitudinally spaced positions thereof, and printed circuit means carried by said body and interconnecting said said sets of contacts in predetermined relationship; at least one auxiliary connector including a body of insulating material having a jack defining bore in an end thereof, a plurality of connector contacts carried by said auxiliary connector body and projecting into the interior of the bore thereof, a plurality of circuit terminating means secured to the exterior of said auxiliary connector body, and printed circuit conduction paths carried by said auxiliary connector body connecting the connector contacts carried thereby to said circuit terminating means; a plurality of multiple conductor cables; and a plurality of hollow plugs of insulating material each having a plurality of plug contacts with exterior portions correspondingly longitudinally spaced and complementary to said sets of multiple connector and auxiliary connector contacts, two of said plugs receiving the opposite ends of one of said cables with the contacts of said plugs correspondingly connected to the conductors of said one cable, said two plugs respectively removably inserted into one of the bores of said multiple connector body and into the bore of said auxiliary connector body with the exterior portions of the plug contacts correspondingly engaged with the sets of multiple connector and auxiliary connector contacts, the remainder of said plugs respectively receiving an end of the remainder of said cables with the contacts of the plugs correspondingly connected to the conductors of the cables, said remainder of said plugs respectively removably inserted into the remainder of the bores of said multiple connector body with the exterior portions of the plug contacts engaged with the sets of multiple connector contacts.

References Cited in the file of this patent

UNITED STATES PATENTS

| | | |
|---|---|---|
| 2,434,534 | Alford | Jan. 13, 1948 |
| 2,914,254 | Lehman | Nov. 24, 1959 |
| 2,952,769 | Eitel et al. | Sept. 13, 1960 |
| 3,001,167 | Chesnutt et al. | Sept. 19, 1961 |